United States Patent
Tu et al.

(10) Patent No.: US 8,175,801 B2
(45) Date of Patent: May 8, 2012

(54) LINK PROMOTION METHOD AND APPARATUS FOR IMPROVING ROUTE SEARCH PERFORMANCE FOR NAVIGATION SYSTEM

(75) Inventors: Ihung Tu, Torrance, CA (US); Lei Zhao, Torrance, CA (US); Ashish Patel, Torrance, CA (US); Tien Vu, Torrance, CA (US); Luoyi Ren, Torrance, CA (US); Serge Orlov, Torrance, CA (US); Ankur Bhatia, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 524 days.

(21) Appl. No.: 12/380,525

(22) Filed: Feb. 28, 2009

(65) Prior Publication Data

US 2010/0222995 A1    Sep. 2, 2010

(51) Int. Cl.
*G01C 21/00* (2006.01)

(52) U.S. Cl. .................. 701/410; 701/409; 701/467

(58) Field of Classification Search .......... 701/200–226, 701/400–541
See application file for complete search history.

(56) References Cited

U.S. PATENT DOCUMENTS

2005/0203937 A1 * 9/2005 Nomura .............. 707/102

FOREIGN PATENT DOCUMENTS

| JP | 11-14385 | 1/1999 |
|---|---|---|
| JP | 2005-172675 | 6/2005 |

* cited by examiner

*Primary Examiner* — Michael Misiaszek
(74) *Attorney, Agent, or Firm* — Muramatsu & Associates

(57) ABSTRACT

A method and apparatus for link promotion for a navigation system allows expansion of search in a lower layer to determine an optimum climbing point to an upper layer to search an optimum route. The link promotion procedure includes the steps of determining whether an upper link exists for a lower link, setting the upper link as a promoted link if such an upper link exists even if a climbing node point does not exist that connect the lower link and the upper link, and comparing a candidate normal route and a promoted route to find an optimum route.

20 Claims, 17 Drawing Sheets

LINK PROMOTION METHOD AND APPARATUS FOR IMPROVING ROUTE SEARCH PERFORMANCE FOR NAVIGATION SYSTEM

FIELD OF THE INVENTION

This invention relates generally to a route search method and apparatus for a navigation system, and more particularly, to a link promotion method and apparatus for finding an optimum route to a destination for a navigation system where the link promotion allows expansion of search range in a lower layer to determine an optimum climbing point to an upper layer of map data in the layered structure during an operation of finding an optimum route between the start point and the destination.

BACKGROUND OF THE INVENTION

A navigation system performs travel guidance for enabling a user to easily and quickly reach the selected destination. A typical example is a vehicle navigation system where a vehicle is equipped with a navigation function to guide a user to a destination through a calculated route. Such a navigation system detects the position of the user's vehicle, and reads out map data pertaining to an area at the current vehicle position from a data storage medium, for example, a CD-ROM (compact disc read-only memory), a DVD (digital versatile disc), or a hard disc. Typically, the navigation system displays a map image on a monitor screen while superimposing thereon a mark representing the current location of the user. At an intersection, the navigation system notifies the user which direction to turn at the intersection.

Typically, a navigation system stores the map data which is in a multiple-level (layered) structure that stores links, nodes and other information for each layer of the map data. For calculating a route between the start point and the end point (destination), the navigation system checks various possible links starting from both the start point and the end point with use of, for example, an A* algorithm. Such an example is shown in FIGS. 1A and 1B where the navigation system simultaneously searches a route from the vehicle position (start point) VP to the destination (end point) Dst. Two elliptic marks A1 and A2 indicate general search directions and search areas for the search operations using the A* algorithm.

The elliptic marks A1 and A2 are established from the vehicle position VP toward the destination Dst and vice versa to limit the search directions and search areas. As the search progresses, the segments of routes from the vehicle position VP and from the destination Dst meet to create a complete route (calculated route) that connects the current vehicle position VP and the destination Dst. During this process, the navigation system attempts to climb up to the map data of upper layer, which generally has a network of higher class routes and thus fewer links (nodes), to speed up the process of searching a route as well as to find a quicker route, for example, using freeways.

FIGS. 2A and 2B are schematic diagrams showing a situation wherein an inefficient route can be produced when searching links in the map data of layered structure. As shown in the arrows of FIG. 2A, a route 21 makes a right turn at the second street and comes back to the same point indicated by a circle 22 through the first street before proceeding to the north (upper direction). Such an inefficient and unwanted route is caused because of an inappropriate climbing point between the two layers of different level of the map data as will be explained below with reference to FIG. 2B.

FIG. 2B shows an upper layer 59A, a middle layer 59B, and a lower layer 59C of the map data, which is directed to the situation where the navigation searches links in the lower layer 59C and the middle layer 59B. In general, due to the smaller number of links in a higher layer, the route calculation covering the same range is more efficiently conducted at an upper level. Thus, it is preferable that the route search operation be conducted at the higher level if there is a node that can allow the process to climb to the upper layer of the map data.

In the example of FIG. 2B, the lower layer 59C includes links L01-L03, L11, L21-25 and L31 each being connected at corresponding nodes N. Some nodes, such as a node N01 or a node N33, are climbing-up points each allowing climbing up or down between the two different layers. The node N01 in the lower layer 59C allows the route to climb up to an upper node N11 in the middle layer 59B as indicated by the dotted line. In this example, a start point 19 is on the link L21 in the lower layer 59C.

The links L11 and L21-L25 in the lower layer 59C correspond to the links L200 in the upper layer 59A and the link L20 in the middle layer 59B. In other words, the road expressed by the links L200 and L20 in the upper layer 59A and the middle layer 59B and the road expressed by the links L11 and L21-25 in the lower layer 59C are the same such as a freeway or a high class street. In the lower layer of map data, such a road is configured by many links of relatively short length while the same road is configured by a small number of relatively long links in the higher layer of the map data.

In the route calculation process, the navigation system will explore possible links and weigh the cost of each link to find the route between the start point and the destination. After the link L21, the link L03 and the link L22 are possible link candidates. For exploring the route via the link L03, the candidate route is the link L02, and then the link L01. At the end of the link L01, the node N01 allows the route to climb-up to the upper node N11 on the middle layer 59B. On the other hand, exploring the route through the link L22, the next link is L23, and then, the link L24, and so on.

When both routes are explored, if the first route comprising link L03, L02, and L01 which has the climbing-up node N01 is found to exist, the climbing-up operation will take priority. That is, when the climb up node N01 is found while the node N29 fails to climb to an upper node, the tendency is to prioritize the node N01. This is true even if the second route comprising the links L22, L23, etc. is eventually able to reach the node N33 that allows climbing-up to the upper node N35, since the node N29 is outside of the predetermined search range 75. Thus, the second route will no longer be taken into consideration for route calculation and the link data associated with the second route will be deleted.

However, the first route causes the inefficient route as shown in FIG. 2A by returning to the point that has already passed. Thus, there is a need for a new route search method for a navigation system that overcomes the shortcoming described above.

SUMMARY OF THE INVENTION

It is, therefore, an object of the present invention to provide a route search method and apparatus for a navigation system which is capable of searching an efficient route between a start point and a destination when examining the map data in a layered structure.

It is another object of the present invention to provide a link promotion method and apparatus for a navigation system which is capable of efficiently promoting a link on a lower layer of map data to a corresponding link on a higher layer of the map data for searching an efficient route between a start point and a destination.

It is a further object of the present invention to provide a link promotion method and apparatus for a navigation system which is capable of efficiently promoting a link on a lower layer of map data to a corresponding link on a higher layer of the map data even when there is no node for shifting between different layers of map data.

It is a further object of the present invention to provide a vehicle navigation system which implements the link promotion method and apparatus of the present invention for efficiently promoting a link on a lower layer of map data to a corresponding link on a higher layer of the map data for searching an efficient route between a start point and a destination.

One aspect of the present invention is a link promotion method for a navigation system to effectively search a route between a start point and a destination. The method includes the steps of: executing a predetermined route search algorithm on map data having a layered structure for a predetermined direction between the start point and the destination for each predetermined search range; retrieving candidate links from the map data for creating a route between the start point and the destination and temporarily storing the candidate links in a data storage; applying climbing criteria and promotion criteria to the candidate links retrieved from the data storage to find whether there is a link in a lower layer of the map data to be promoted to a corresponding link in a higher layer of the map data; storing data related to the links in the lower layer and the higher layer that have satisfied the climbing criteria and the promotion criteria; and building a path between the destination and the start point by processing the data related to the links that have satisfied the criteria in a direction opposite to the predetermined direction executed for the route search algorithm.

The method of the present invention further includes a step of shifting from the link in the lower layer to the corresponding link in the higher layer even when there is no climbing-up node between the two links when the relationship between the two links have satisfied the promotion criteria. In the method of the present invention, the step of retrieving the candidate links from the map data includes a step of searching a successor link that is successive to a current link and calculating a cost of each successor link.

In the method of the present invention, the data storage includes an expansion link list for storing the candidate links, an expansion heap for storing the current link as a parent link of the successor link, and a climbing link list for storing the corresponding link in the higher layer as a climbing link when either there is a climbing-up node or the promotion criteria is satisfied, where the link in the lower layer that corresponds to the climbing link is stored in the expansion heap as a parent link of the climbing link.

In the method of the present invention, the step of searching the successor link that is successive to a current link includes a step of obtaining a successor link of lowest cost where the cost is determined by factors including a distance, time, and fees associated with the successor link. The method further includes a step of deleting the data in the expansion link list every time when all of the candidate links within the predetermined search range have been examined.

In the method of the present invention, the promotion criteria is satisfied when there is a link in the higher layer of the map data that corresponds to a link in the lower layer, and the climbing criteria is satisfied when there is a climbing-up node between the lower layer and the upper layer within the predetermined search range.

In the method of the present invention, the step of building the path between the destination and the start point includes a step of removing copies of series of links in the lower layer from the start point to the parent link and a step of removing the climbing link corresponding to the parent link. Further, the method includes a step of merging links that have been remained after the removal of the links, thereby building a route that shifts the different layers of the map data via a climbing-up node.

The method of the present invention further includes a step of evaluating a cost associated with a route involving the links that have satisfied the promotion criteria in comparison with a cost associated with a route without using the link promotion.

Another aspect of the present invention is an apparatus for searching an optimum path for a navigation system by using the link promotion method. The route search apparatus conducts the link promotion for the links on the current layer of the map data to that corresponding to an upper layer of the map data to obtain the data necessary for building an optimum route. The route search apparatus builds the optimum route by processing the promoted links and other associated links by implementing the various steps defined in the route search method noted above.

According to the present invention, a route search method and apparatus enables a navigation system to search an efficient route between a start point and a destination when examining the map data in a layered structure. The navigation system searches and calculates a route between the start point and the destination, checks various possible links starting from both the start point and the end point with use of a predetermined algorithm. During such an operation, the route search method and apparatus conducts the "link promotion" for the links on the current map data layer to that corresponding to an upper layer of map data to obtain an optimum route. The link promotion method and apparatus determines whether there is a higher level street for a link (road segment) on the current layer of the map data. If a corresponding higher level link is found, the method operates to effectively promote a link that satisfies the predetermined condition to the upper layer even though there is no climbing-up node for the link. After such links are promoted, the navigation system will determine an optimal route based on the promoted links and associated links via a route building process. Accordingly, the present invention is able to prevent an inappropriate climbing point from being included in the final route between the start point and the destination.

BRIEF DESCRIPTION OF THE DRAWINGS

FIG. 6A is a flow chart showing an example of an overall process for searching a route, and FIGS. 6B-6D are diagrams corresponding to that of FIG. 2B to show how the links in the different layers of the map data are examined, stored, and used by the present invention.

FIG. 8A is a flow chart showing an example of detailed steps of processing the promoted links and associated links corresponding to the steps 112 and 113 in FIG. 6A to build a final route, and FIGS. 8B-8E are diagrams corresponding to that of FIGS. 2B and 6B-6D to show how the final route is built via the process shown in FIG. 8A.

DETAILED DESCRIPTION OF THE PREFERRED EMBODIMENT

Figure 1A:
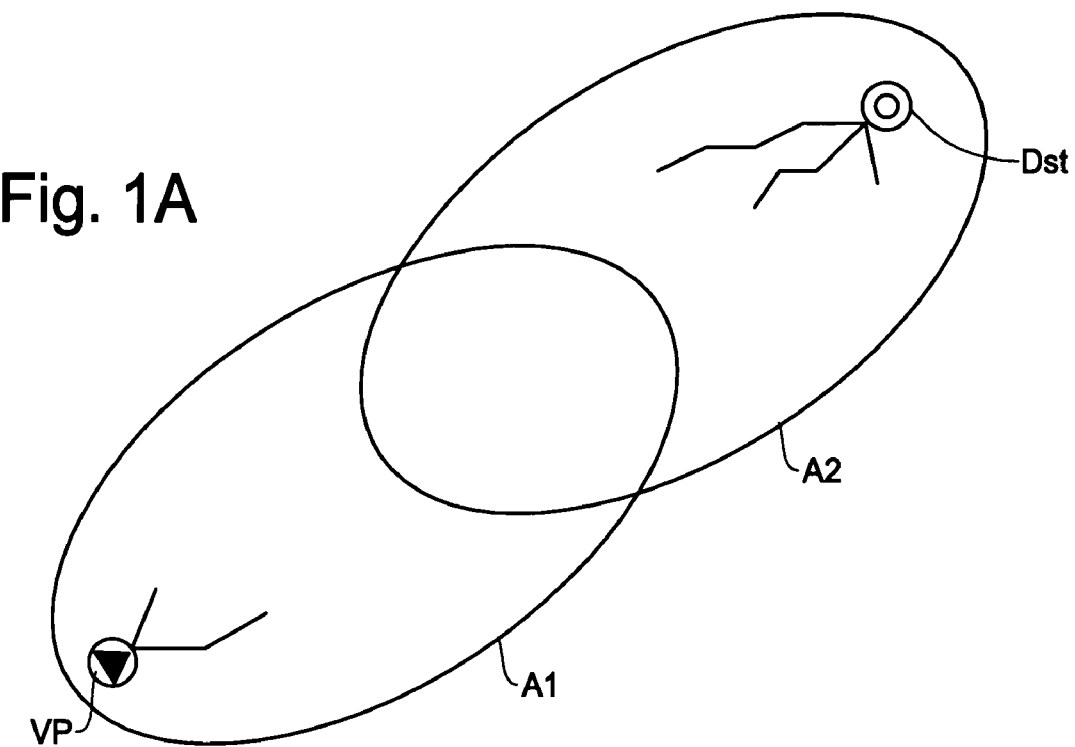
FIGS. 1A and 1B are schematic diagrams illustrating an example of finding a route from a start point to a destination under an A* algorithm search that starts search from both the start point and the destination.

The method and apparatus for link promotion to be used for a navigation system under the present invention will be described in detail with reference to the accompanying drawings. Typically, a navigation system stores the map data in a data storage device in which the map data is configured in a layered structure where each layer stores the links, nodes and other information. In such a layered structure, the higher layer represents only high class roads, for example, interstate highway, freeway, etc. with road links (road segments) of relatively large length and covers the wider area. In contrast, the lower layer represents low class roads, i.e., residential roads, etc. with many road links (road segments) of relatively short length, POI icons, building foot prints, etc., in addition to that represented by the higher layers.

For searching and calculating a route between the start point and the end point (destination), the navigation system checks various possible links starting from both the start point and the end point with use of, for example, an A* algorithm. When performing the route calculation, each link that is connected to the current expansion node is examined with respect to the cost of the link. The link cost is determined by taking such factors as a distance, a time length, a class of road, speed limits, traffic regulations, etc., into consideration.

During such a route calculation process, higher level links such as freeway links are generally considered as lower costs since the user can reach the destination with a shorter travel time. Thus, when the quickest route is to be calculated, the higher links are typically selected as much as possible so long as there are connection nodes between the higher layer and the lower layer of the map data. Within the context of the present invention, the shift from the lower layer to the higher layer through climbing-up nodes is referred to as "link climbing".

In addition to the "link climbing" known in the conventional technology, the route search method of the present invention conducts "link promotion" for the links on the current map data layer to that corresponding to an upper layer of map data to obtain an optimum route. The "link promotion" is conducted between the lower link and the upper link even though there is no climbing-up node between them. In other words, within the context of the present invention, the "link promotion" means that a particular link on the current layer is shifted to a corresponding link in the upper layer for the purpose of route search and calculation if link promotion criteria described later is satisfied.

The link promotion method and apparatus determines whether there is a higher level street for a link (road segment) on the current layer of the map data. If a corresponding higher level link is found, the method operates to effectively promote a link that satisfies the predetermined condition or criteria to the upper layer even though there is no climbing-up node for the link. After such links are promoted, the navigation system will determine an optimal route based on the promoted links and associated links via a route building process.

Figure 3:
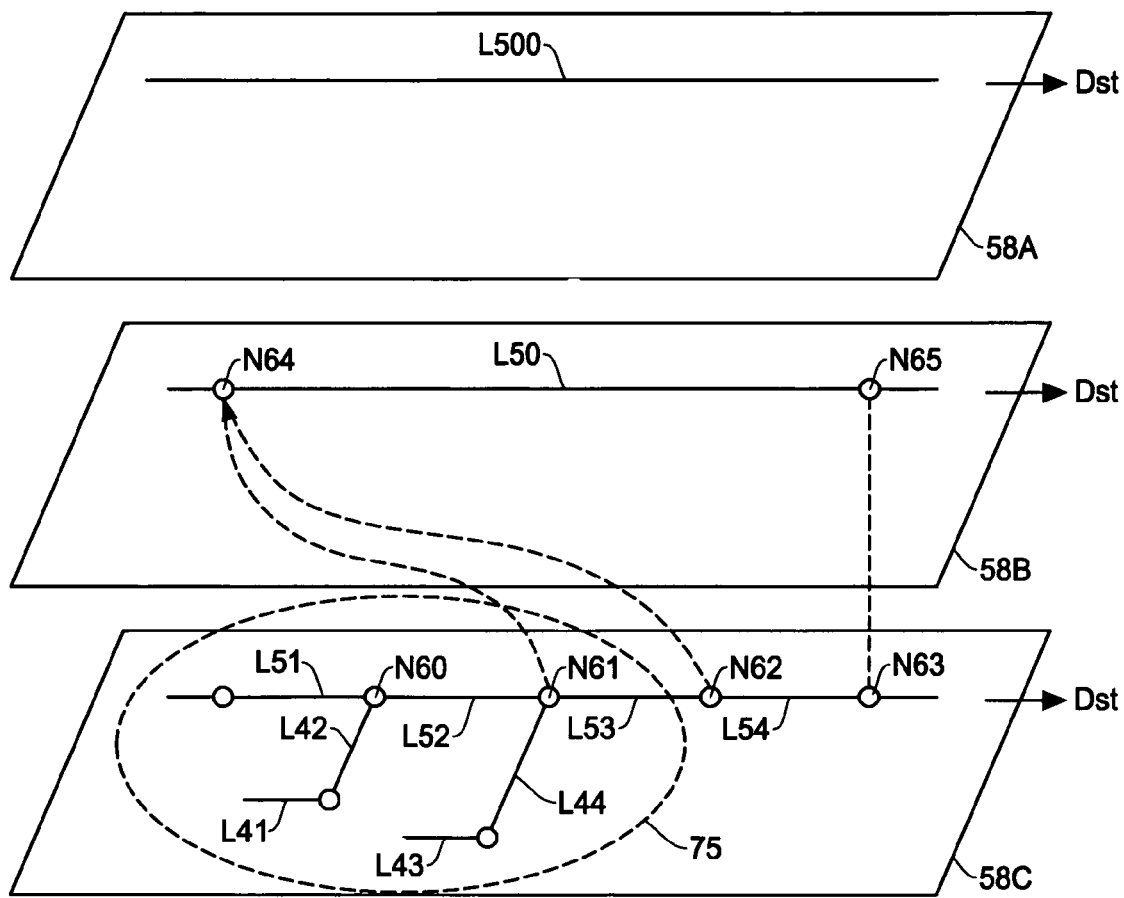
FIG. 3 is a schematic diagram showing three layers of map data for explaining the method of the present invention for promoting the links from the lower layer to the higher layer to find an optimum promotion point to calculate an optimum route.

FIG. 3 is a schematic diagram showing three layers of map data for describing the basic concept of the link promotion method implemented in the route search operation of the present invention. An upper level 58A has a link L500, a middle layer 58B has a link L50 with nodes N64 and N65 that corresponds to the link L500 in the upper layer 58A. A lower layer 58C has links L41, L42, L43, L44, L51, L52, L53, L54 where the links L51-L54 correspond to the link L50 in the middle layer 58B. The lower layer 58C also has nodes such as N60, N61, N62 and N63 where the node N63 is a climbing-up node to the node N65 in the middle layer 58B. In this example, on the lower layer 58C, one path expands through the links L41, L42, L52 toward the destination Dst, and the other path expands through the links L43, L44, L53 toward the destination Dst.

The links L51, L52, L53, and L54 in the lower layer 58C correspond to the link L500 in the upper layer 58A and the link L50 in the middle layer 58B. In other words, similar to the example of FIG. 2B noted above, the road expressed by the links L500 and L50 in the upper and middle layers and the road expressed by the links L51, L52, L53, and L54 in the lower layer are the same such as a freeway or other high class rode. Since such a freeway is the highest class road, the information on the links of the freeway is expressed on the lowest layer to the highest layer with different degrees of detail. As noted above, in the lower layer of map data, such a road is configured by many links of relatively short length while the road is configured by a small number of relatively long links in the higher layer of map data.

Under the present invention, the links in the lower layer of map data will be promoted to the links of the same road in the higher layer according to the promotion criteria. The promotion criteria under the present invention is whether a link has its corresponding upper layer link, i.e., the same road is expressed by the map data in the higher layer by a longer link. Thus, in the case where a link or links satisfy the promotion criteria, the link will be promoted to the upper link unless the corresponding upper link and such an upper link is stored in a climbing link list (FIG. 4), for the route search and calculation operation.

Figure 4:
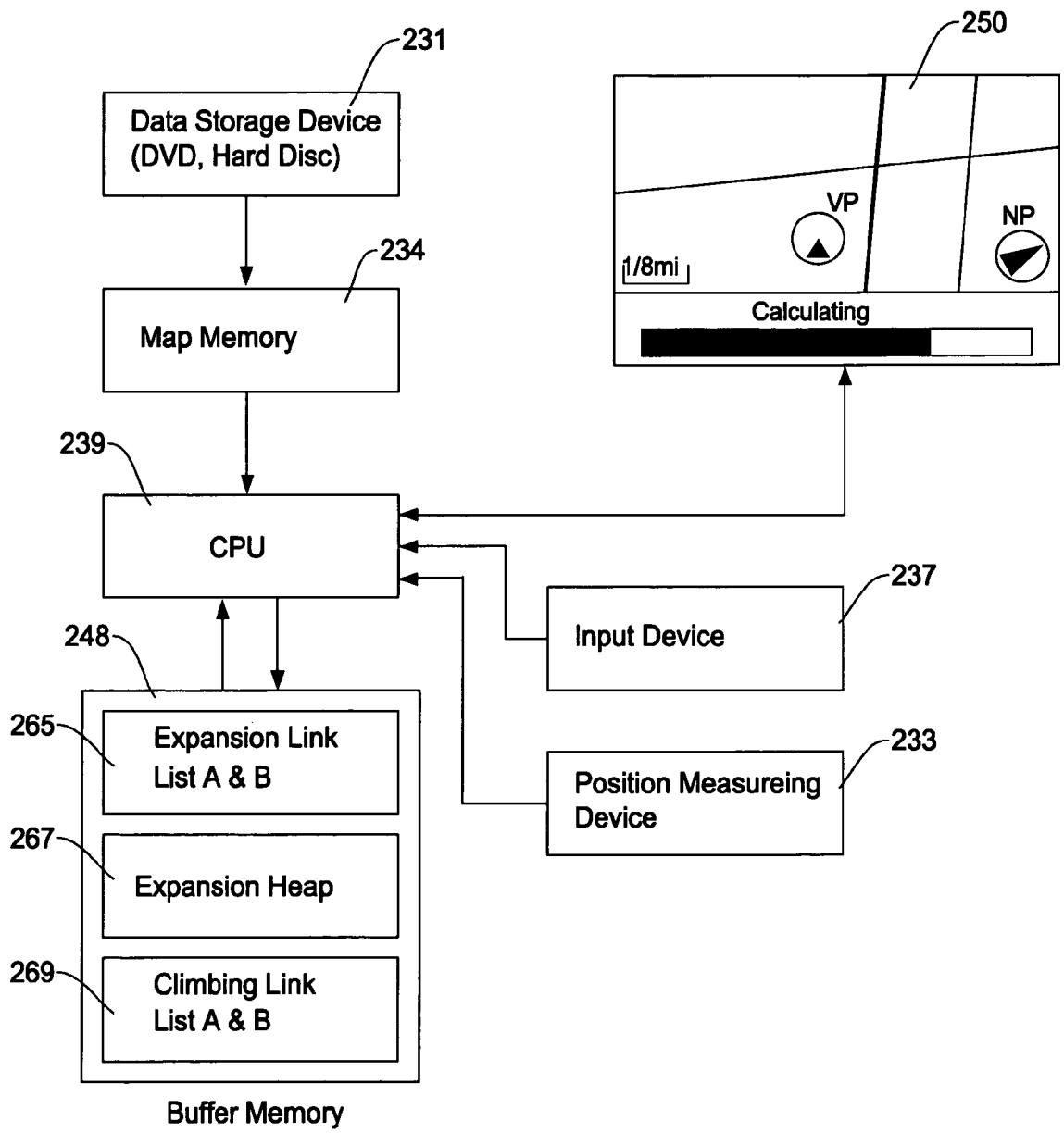
FIG. 4 is a functional diagram showing an example of structure of the link promotion apparatus for the navigation system including data storage areas associated with the route search method of the present invention.

Both candidate links L52 and L53 in the layer 58C have the corresponding link L50 in the middle layer 58B which is higher than the layer 58C, and it is assumed that the link L50 has not been treated as the climbing link. Thus, the links L52 and L53 are promoted to the upper layer 58B even though these links do not have a climb-up node. Accordingly, the links L52 and L53 in the lower layer 58C will be inserted (stored) in an expansion heap (FIG. 4) and the link L50 in the middle layer 58B will be added to a climbing link list (FIG. 4). It should be noted that the climbing link list also includes an upper link that is obtained by the "link climbing" in the conventional route search process where the lower link is able to climbing-up to the upper link through the climbing-up node.

At this stage, the link promotion procedure tentatively connects the nodes N61 and N62 in the lower layer 58C to the node N64 on the middle layer 58B even before reaching the climbing-up node N63 on the lower layer 58C. Namely, in the link promotion method of the present invention, the link L52 in the lower layer 58C is promoted to the Link 50 in the middle layer 58B even though the node N61 associated with this link is not a climbing-up node for the route search purpose. Further, the link L53 in the lower layer 58C is promoted to the Link 50 in the middle layer 58B even though the node N62 is not a climbing-up node. As will be explained later with reference to FIGS. 8A-8E, after this link promotion procedure, the tentative connection is corrected to reflect the actual streets for more accurately evaluating the costs (distance, time, fees, etc.).

As will be described later with reference to the flow chart in FIGS. 6A and 8A-8E, the navigation system will build the best path to generate the final route. This involves comparing a plurality of candidate links or paths to find the best route. The navigation system may use a link cost and a path cost in calculating the overall costs of candidate routes. The link cost is an estimated cost involved in taking a particular link, and the path cost is an accumulated cost of the path.

In the example shown in FIG. 3, after the link L52 is promoted, the accumulated path cost of the link L50 is equal to the sum of the accumulated path cost of the link L52 and the link cost of the link L50. This is represented as:

PathCost(L50)=PathCost(L52)+LinkCost(L50)

The accumulated path cost of the link L54 at the lower level is equal to the sum of the accumulated path cost of the link L52, the link cost L53, and the link cost of the link L54:

PathCost(L54)=PathCost(L52)+LinkCost(L53)+LinkCost(L54)

The difference between the two accumulated path costs is expressed as:

difference=PathCost(L50)−PathCost(L54)=LinkCost(L50)−LinkCost(L53)−LinkCost(L54)

In calculating the cost of the route involving a promoted link, the navigation system may judge the route involving the promoted link to be of higher cost to assure that the route involving the promoted link, should be selected over a normal route, is indeed the route worth taking. One way to weigh the route to favor a normal route is to calculate the cost of normal route by taking a straight line distance for the normal route, which will be shorter than actual distance.

FIG. 4 is a functional block diagram showing an example of basic structure of the link promotion apparatus of the present invention for searching and calculating an optimum route between the start point and the destination for the navigation system. The structure of FIG. 4 is applicable to any electronic device having a navigation function which enables the electronic device to guide the user to a particular location as noted above. The link promotion apparatus of the present invention includes a monitor 250 for graphical user interface, and a controller (CPU) 239 for controlling an overall operation of the apparatus of the present invention.

The block diagram of FIG. 4 further includes a data storage device 231 such as a DVD or a hard disc for storing map data, a map memory 234 for storing a required portion of the map data retrieved from the data storage device 131, an input device 237 such as a joystick, a remote controller or other input device for the user to select menus, change directions, scroll the screen, change the location of the cursor on the screen, etc., a position measuring device 233 for detecting a current position of the user, and a buffer memory 248 for temporarily storing data for route searching and calculation operation under the present invention.

In FIG. 4, the link promotion apparatus under the present invention is able to retrieve the map data from the data storage device 231 and the map memory 234. As noted above, the map data is in the layered structure where a series of road links, nodes, etc. are retrieved based on the location of the start point and the destination specified by the user through the input device 237, etc. Based on the retrieved map data, the link promotion apparatus examines various possible routes by temporarily storing the necessary data in the buffer memory 248 for route calculation. The CPU 239 controls an overall operation of finding an optimum route to the destination under the present invention.

Figure 1B:
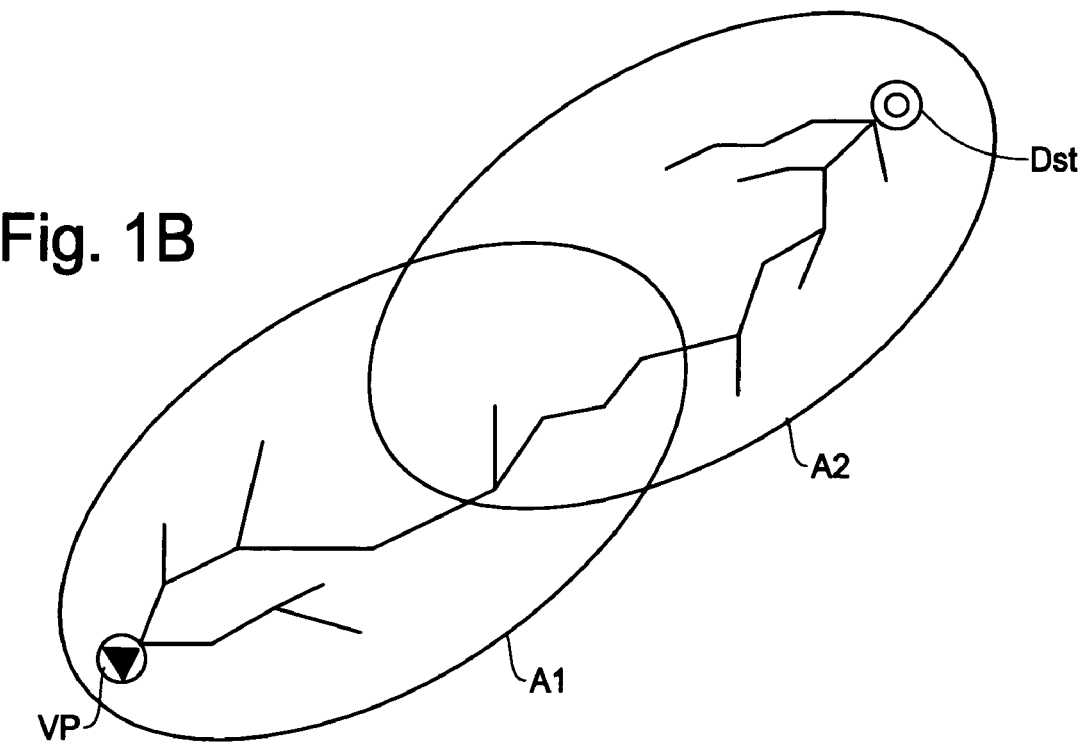

When the user specifies a destination, the CPU 239 starts the route search operation such as by the A* algorithm shown in FIG. 1. The CPU 239 knows where the vehicle (user) is currently located, i.e., the starting point, based on the data from the position measuring device 233. The CPU 239 retrieves the map data and stores the map data such as links and nodes in the buffer memory 248 for determining the optimum route. The CPU 239 controls the route search operation so as to broaden the chance of climbing-up to the upper layer of the map data by finding the links that are common between the different layers of map data.

Figure 2A:
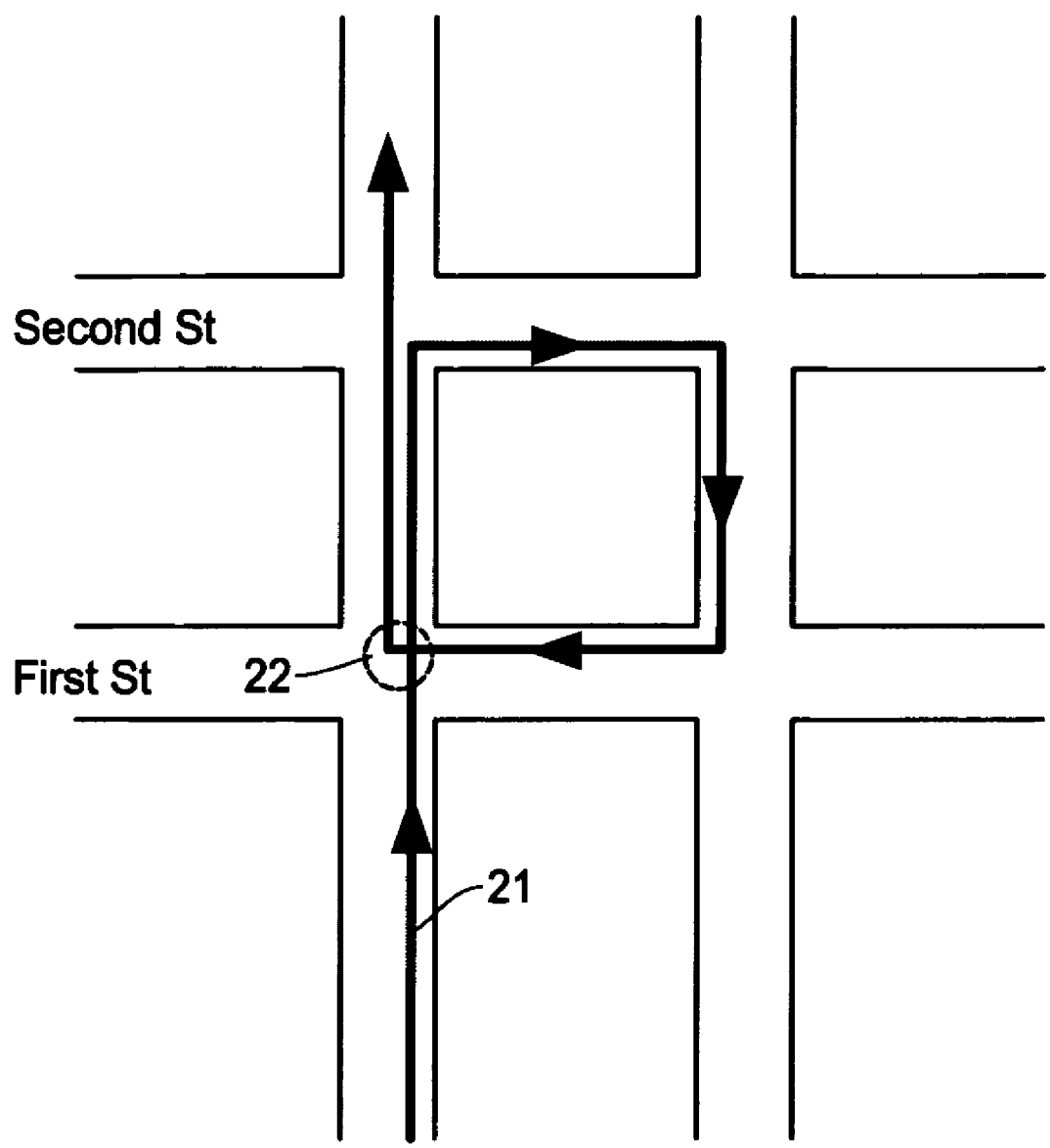
FIG. 2A is a schematic map view showing an inefficient route that would be generated in a conventional navigation system due to an inappropriate climbing point.
Figure 2B:
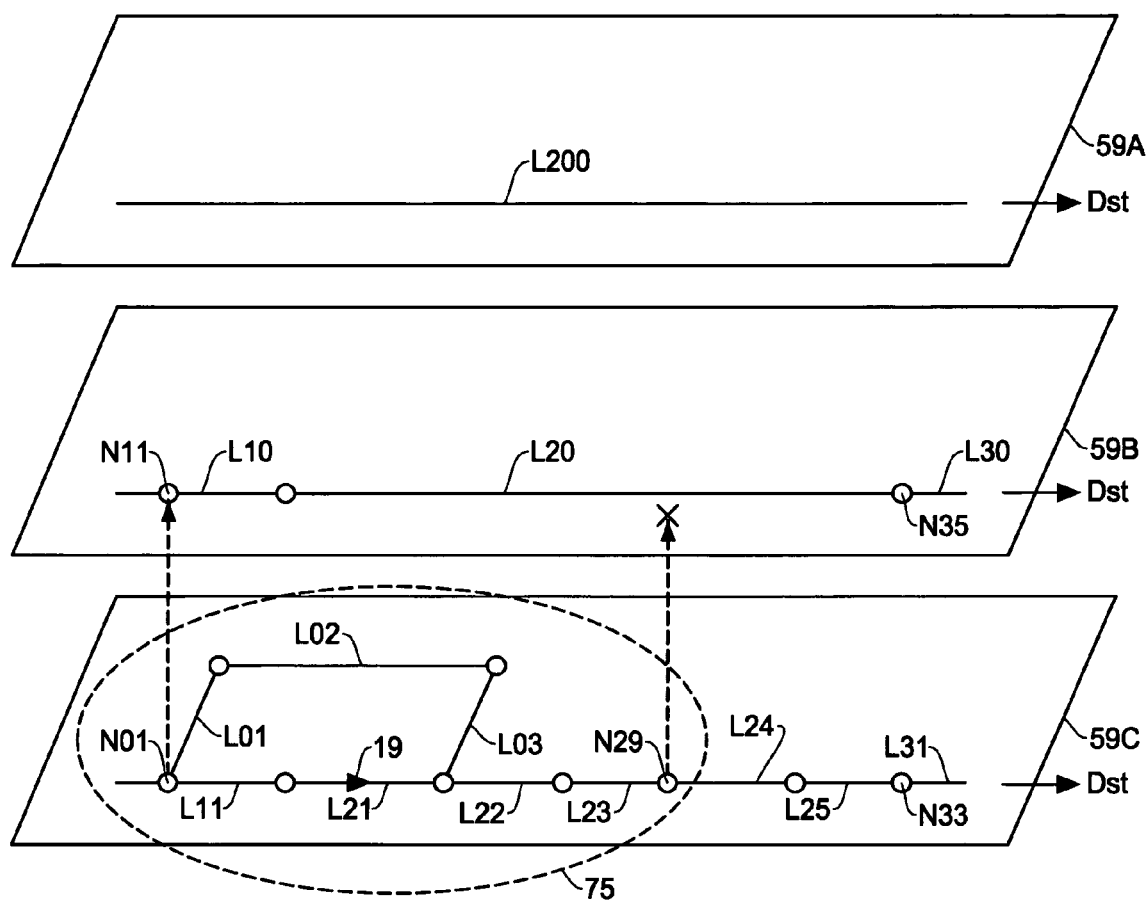
FIG. 2B is a schematic view showing a layered structure of the map data each having links and nodes to describe the route search procedure and problems involved in the conventional technology.

To facilitate this operation, the buffer memory 248 or other data storage is configured as shown in FIG. 4 to store the selected type of information for route search and calculation under the present invention. As shown, the buffer memory 248 includes an expansion link list 265, an expansion heap 267, and a climbing link list 269 each storing the selected map data for the route search and calculation. The data to be stored in these data storage areas or lists will be retrieved from the map data which is in the layered structure as shown in FIGS. 2B and 3 with respect to the predetermined search range 75.

The expansion link list 265 stores any potential candidate links during the route search operation. Among the candidate links, the navigation system selects the links that should be promoted to the upper link and stores them as parent links in the expansion heap 267 to be used for the route calculation. The climbing link list 269 stores an upper layer link that corresponds to the lower layer links that have been either climbed-up through the climbing-up node or promoted based on the promotion criteria. Preferably, the expansion link list pair A and B, and the climbing link list pair A and B may be used for conducting the route search from the starting point as well as the destination point.

Figure 5:
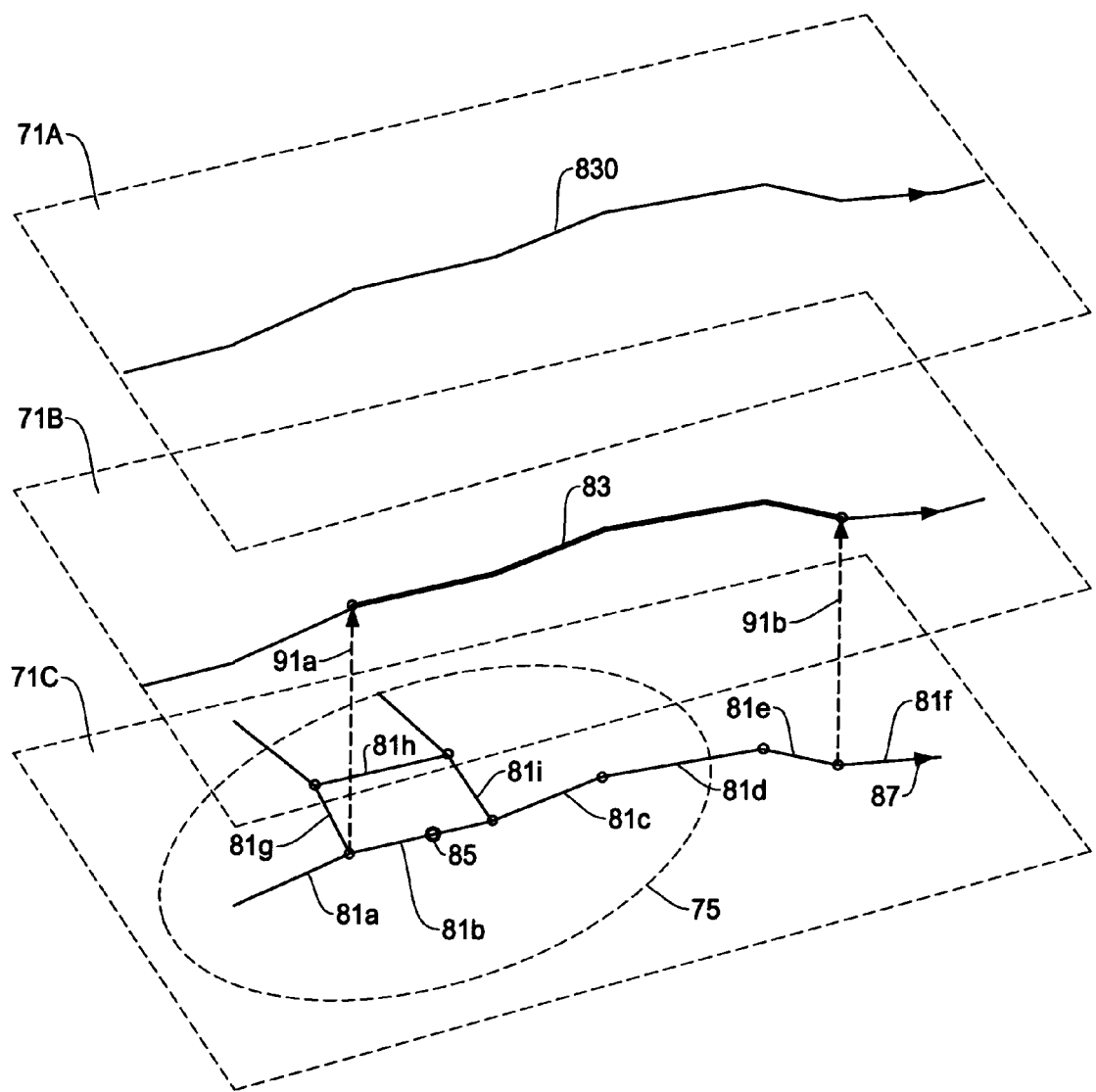
FIG. 5 is a schematic view showing an image of the layered structure of the map data related to the present invention where the links and nodes are expressed in the three different layers of the map data.

FIG. 5 is a schematic view showing an upper layer 71A, a middle layer 71B, and a lower layer 71C of the map data for explaining the link promotion method of the present invention. In this example, the lower layer 71C of the map data includes data concerning a plurality of road links 81a, 81b, 81c, 81d, 81e, 81f, 81g, 81h and 81i. The higher layer 71A and middle layer 71B of the map data include road links 830 and 83, respectively, that correspond to the links 81b, 81c, 81d and 81e in the lower layer 71C.

In other words, similar to the examples above, it is presumed that the road expressed by the links 830 and 83 in the upper and middle layers and the road expressed by the links 81b, 81c, 81d and 81e in the lower layer are the same. Since the layered structure of the map data show different levels of details of the road links, the length of links is different between the different layers. The starting point 85 is located on the link 81b and a route search operation should be generally extended to the direction toward the right as indicated by an arrow 87 on the link 81f to reach the destination.

As the route search begins from the starting point 85, the navigation system will find links of least cost such as a current link and immediately next link, etc. The navigation system stores them in the expansion link list 265 as candidate links for route search purposes. In this example, the links 81b, 81i, 81c, 81h and 81g are candidate links since they are within the search range 75 and will be stored in the expansion link list 265.

On one route, next to the links 81i, the links 81h and 81g are selected successively as candidate links, although this route involves a loop like path as described with reference to FIG. 2A as the inefficient route. A climbing-up node that shifts to the higher layer of the map data is found at the intersection of the links 81a, 81b and 81g where the route search operation can move to the upper layer as shown by a dotted line 91a. On the other route that goes toward the right, the links 81c, 81d, and 81e lead to the climbing-up point indicated by a dotted line 91b.

Both the climbing-up points can conceivably be candidates for climbing-up to the higher level while the climb-up at the link 81e (dotted line 91b) is a better candidate. However, the conventional navigation system and the present invention as well select the link 81h (dotted line 91a) even though this route forces the inefficient loop like path (FIG. 2A). This is because the climbing-up node at the end of the link 81e is outside of the search range 75 while the climbing-up node at the end of the link 81g is already found within the search range 75.

However, The link promotion method under the present invention applies the promotion criteria described above and enables the navigation system to consider the climbing line 91b to obtain an optimum route. Based on the promotion criteria, the navigation system determines that the relationship between the link 81c and 83 satisfies the promotion criteria noted above. Thus, the link promotion method will tentatively promote the link 81c on the lower layer 71C to the link 83 in the middle layer 71B even though the link 81c does not have a climbing-up node.

The link 83 is stored in the climbing link list 269 shown in FIG. 4 as a climbing link that corresponds to the lower layer link 81c that has been promoted. The link 81c that has been promoted is stored in the expansion heap 267 as a parent link. Then, the link 83 and the link 81c are used for the route building procedure thereafter and the navigation system later corrects the links to reflect the actual situations of the roads (FIGS. 8A-8E).

Figure 6A:
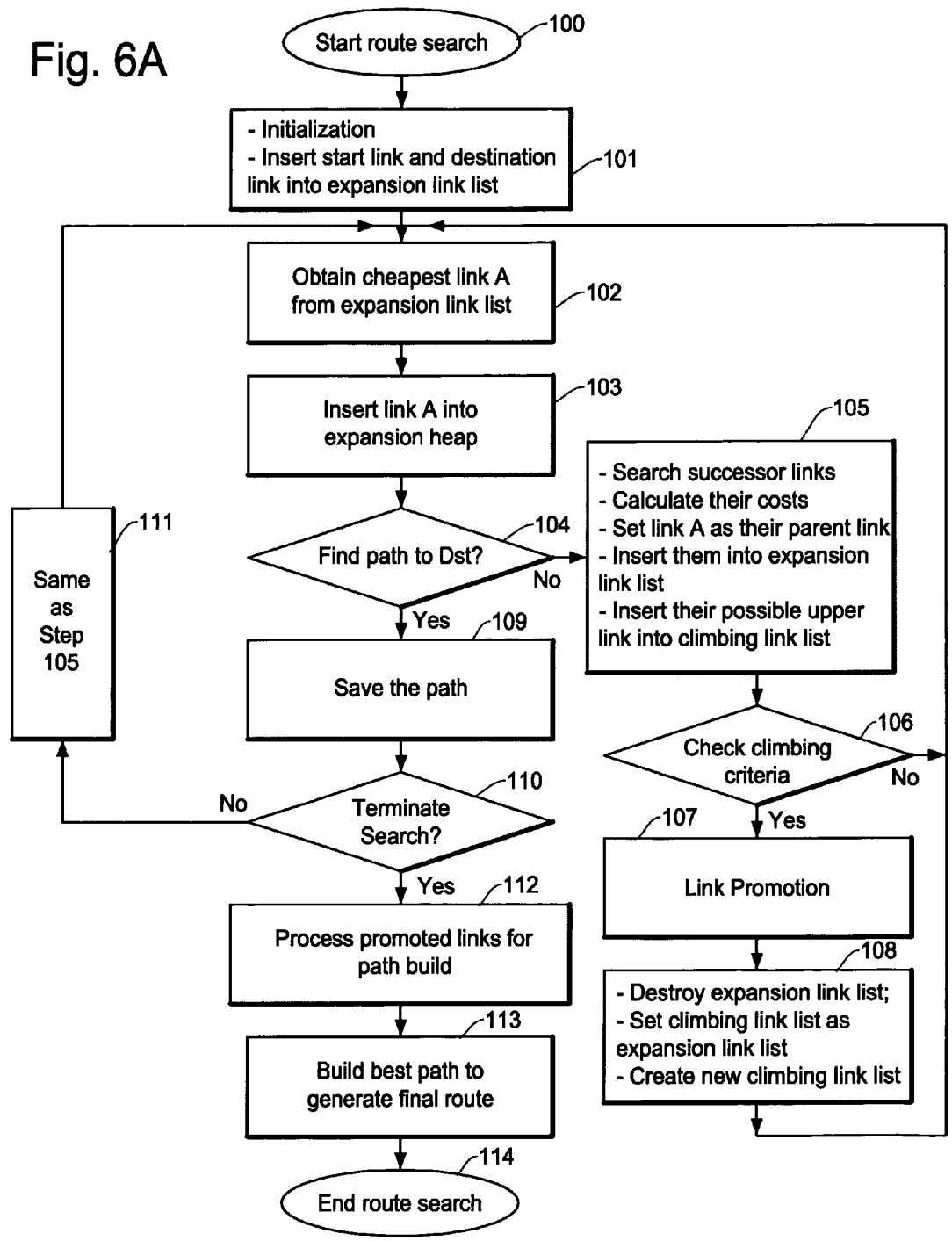
FIGS. 6A-6D show the operation of the link promotion method of the present invention where

The route search implementing the link promotion method under the present invention is explained with reference to the flow chart of FIG. 6A and the schematic views of FIGS. 6B-6D. The flow chart in FIG. 6A shows an example of overall route search procedure using the link promotion method of the present invention. The schematic views of map data shown in FIGS. 6B-6D correspond to that of FIG. 2B to describe the process of evaluating the links in the route search operation of the present invention.

As shown in FIG. 6A, the route search procedure of the present invention starts at the step 100. The buffer memory 248 or other data storage configured as shown in FIG. 4 is initialized to store the selected type of information for the route search and calculation under the present invention. Based on the information provided by the user, the start link and destination link are stored (inserted) in the expansion link list 265. In the case shown in FIG. 6B, as the starting point is on the link L21 (link A), this link is stored in the expansion link list 265 although the destination link is not shown therein.

Based on the predetermined algorithm such as the A* algorithm shown in FIG. 1, the candidate links are consecutively retrieved and stored in the data storage, i.e., the expansion link list 265 shown in FIG. 4. The candidate links are stored and consecutively examined for each search range 75 shown in FIGS. 3 and 5. In the step 102, the navigation system determines and retrieves a link of the lowest cost (in terms of distance, time, fees, traffic condition, etc.) from the expansion link list 265.

Then, in the step 103, the link found in the previous step is inserted into the expansion heap 267 as a parent link of the current link. In the example of FIG. 6B, the link L22 (link B) and the link L03 (also link B) are selected as the lowest-cost (cheapest) link since it is closest to the start point. Then, the link L21 (link A in FIG. 6B) is inserted into the expansion heap 267 shown in FIG. 4 as a parent link of the link L22 (link B).

In the next step 104, the navigation system will determine whether it has found a path (route) to the destination link. If the path to the destination is found in the step 104, the navigation system saves the data concerning the path in the step 109. If the path has not been found, like in the example of FIG. 6B where there is no established path to the destination found from the link L22 or L03, the process moves to the step 105.

As shown in FIG. 6A, the navigation system performs various activities in the step 105 to retrieve the link data step by step under the present invention. Namely, the navigation system searches successor links such as the links L02, L23, etc., in FIGS. 6C-6D and calculates their costs. In the example of FIG. 6C, the next cheapest successor link connected to the link L22 (current link A) is the link L23 (denoted by link B). The navigation system sets the link A (link L22) as a parent link of the link B (link L23) in the expansion heap 267, and inserts (stores) the link B into the expansion link list 265. In this manner, the links are traced and examined toward the destination and their data are stored in the expansion link list 265 and the expansion heap 267 for the predetermined search range 75.

Next, in the step 106, the climbing criteria or condition described above are applied to the parent links and successor links to determine whether the link should climb-up to the higher layer of the map data. The climbing criteria may be applied every time when all the good links are retrieved to the expansion link list 265 for the search range 75 as shown in FIG. 6B and there is a climbing-up node between the lower link and the upper link. Thus, the navigation system examines the links within the search range 75 stored in the expansion link list 265 as to the climbing criteria in the step 106.

Figure 6B:
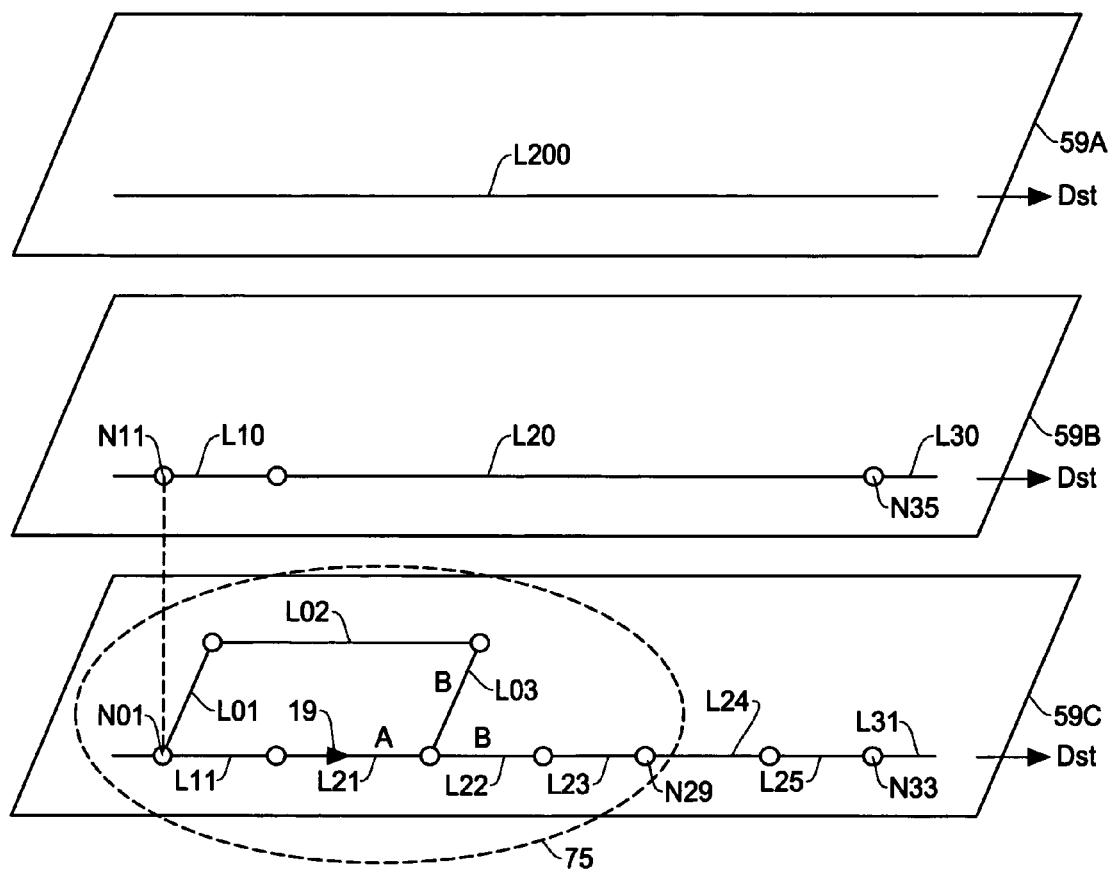
Figure 6C:
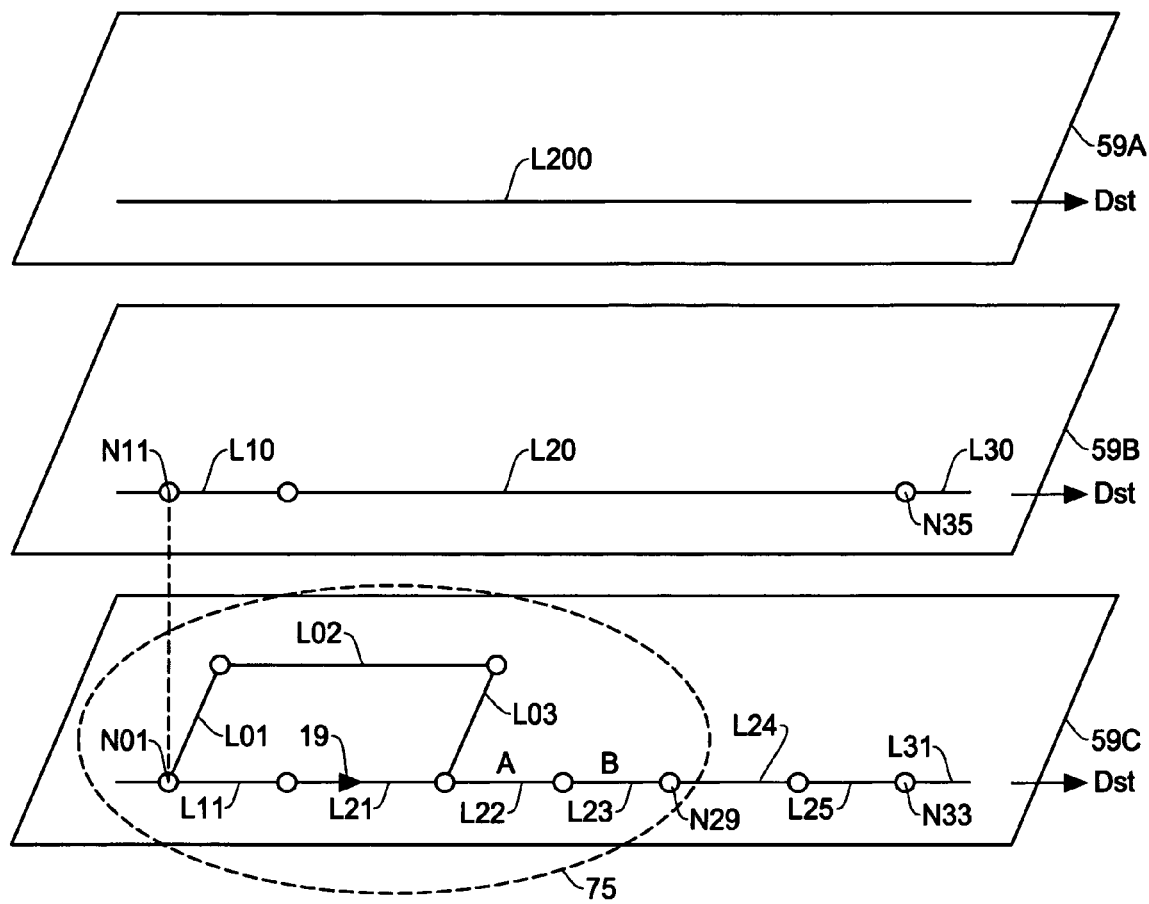

In the example of FIGS. 6B and 6C, the link L10 in the middle layer 59B satisfies the climbing criteria since there is a climbing-up node N01 in the lower layer 59C within the search range 75. If the climbing criteria are not met, the procedure from the steps 102-106 shown in FIG. 6A will be repeated. If the climbing criteria are met, the navigation system will check whether the link promotion criteria are satisfied in the step 107 so that the lower link is promoted to the corresponding link in the upper layer even though the climbing criteria are not satisfied.

Figure 6D:
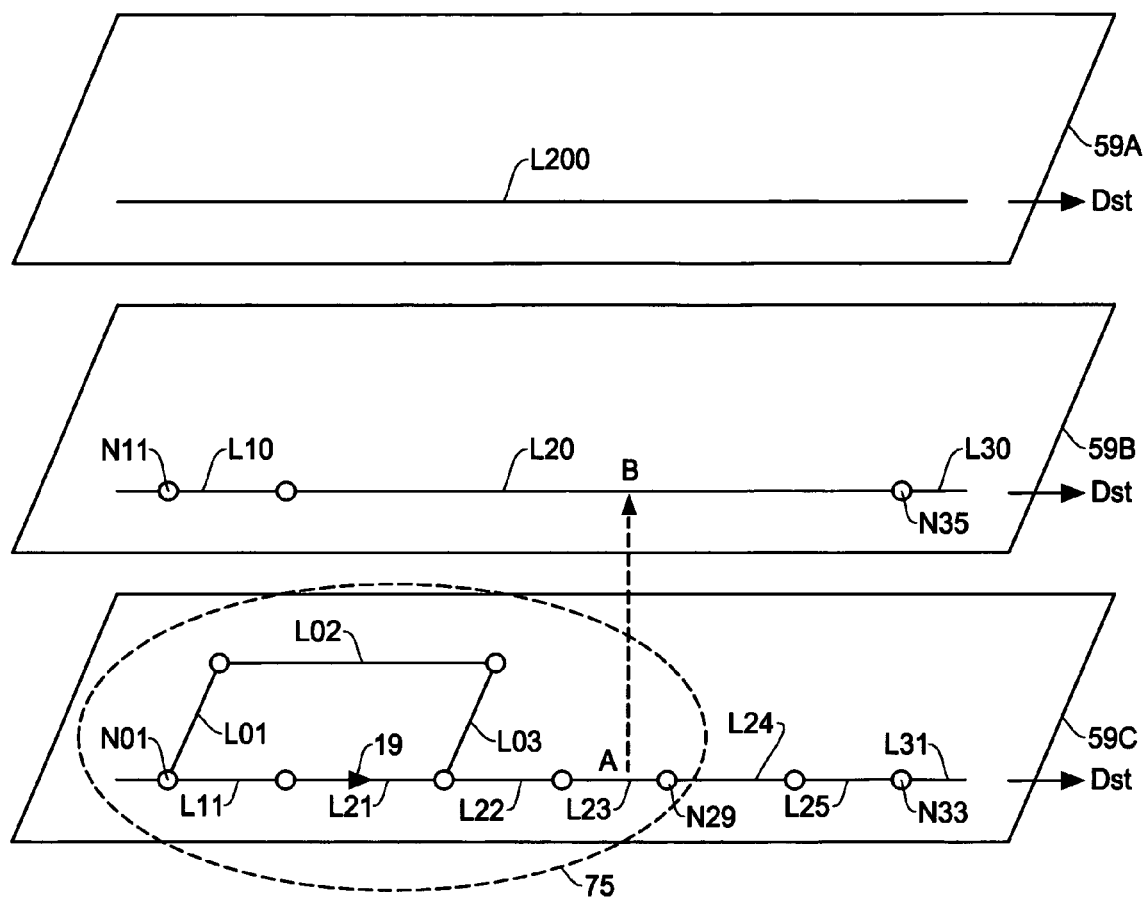

For example, in the condition shown in FIG. 6D where the link L23 (link A) in the lower layer 59C has a corresponding upper link L20 (link B) in the middle layer 59B, the method of the present invention determines that the link promotion criteria are satisfied in the step 107. During the link promotion step, the upper link L20 (link B) is stored in the climbing link list 269. The link L23 (link A) that has been stored in the expansion heap 267 is marked as a parent link of the link L20. The steps 106 and 107 regarding the link promotion will be explained in more detail with reference to the flow chart of FIG. 7.

After the link promotion procedure, in the step 108, the navigation system destroys the expansion link list, i.e., deletes the links on the expansion link list 265. Further in this step, the navigation system sets the climbing link list 269 as the expansion link list 265, and creates a new climbing link list 269 for the next search range. The process goes back to the step 102 so that the foregoing steps will be repeated for the next search range until the route to the destination is found.

Referring back to the step 104 noted above, in conducting the route search procedure, when the navigation system has found a path to the destination, such a path will be saved in the step 109. Then, in the step 110, it is determined whether a condition has been met to terminate the route search operation. If the route search operation should not be terminated, because for example, a further path must be established or there is another destination, the process moves to the step 111 which is basically the same as that of the step 105 noted above.

Namely, in the step 111, the navigation system will search successor links, calculate their costs, set a current link as their parent link in the expansion heap, insert the successor links into the expansion link list 265, and insert their possible upper link into the climbing link list 269. Then, the procedure returns to the step 102 described above to repeat the foregoing steps. On the other hand, if the navigation system determines that the condition to terminate the search has been met in the step 110, the procedure moves to the step 112.

In the step 112, the navigation system processes the climbed links, promoted links and parent links, start and destination links, etc., for building the path between the start point and the destination, which will be described in more detail with reference to FIG. 8. In the step 113, by processing the climbed links, promoted links and parent links, the navigation system will establish an optimum path to generate a final route between the start point and the destination. After establishing the final route, the route search process ends in the step 114.

As noted above, the link promotion procedure will be conducted in the step 107 in FIG. 6A by applying the predetermined promotion criteria to the links obtained in the expansion link list 265 and by detecting the parent links and the promoting link. The link promotion procedure is described in more detail with reference to the flow chart of FIG. 7. As the link promotion procedure is started in the step 120, the navigation system checks whether or not the expansion link list 265 is empty in the step 121.

If the expansion link list 265 is empty, the link promotion procedure will end because there is nothing to process in this procedure. If the expansion link list 265 stores the data indicating a series of links, the navigation system checks and obtains the cheapest link A (link of lowest cost) from the expansion link list 265 in the step 123. In the example of FIG. 6B, if the current link is L21, the cheapest link is either the link L03 or L22 because it is closest, and if the current link is L22, as shown in FIG. 6C, the cheapest link is the link L23, and so on.

In the step 124, it is determined whether the link A has a corresponding upper level link, i.e., the navigation system applies the promotion criteria noted above to the link A. If there is no upper level link, the link A will be released, i.e., dismissed, in the step 125 and the procedure will go back to the step 121 to repeat the above procedure for the next candidate link. On the other hand, when the link A does have its upper level link, the navigation system will retrieve link A's upper level link B in the step 126.

In the case shown in FIG. 6D, for example, the link L23 in the lower layer 59C has a corresponding upper link L20 in the middle layer 59B. Thus, in the step 126, the link L20 in the middle layer 59B will be retrieved as the upper level link B (link L20) of the link A (link L23). In the step 127, the navigation system sets the link A (link L23) as a parent link of the link B (link L20).

In the step 128, the link A will be set as a parent link of the link B in the expansion heap 267 (FIG. 4). Also in the step 128, the link B will be set in the climbing link list 269 (FIG. 4). The above noted procedure will be repeated until the expansion link list 265 (FIG. 4) becomes empty, for example, all of the meaningful links in the search range 75 have been examined.

When the basic search process has been completed so that the path (first stage) between the start point and the destination is found, the navigation system terminates the search process in the step 110 in FIG. 6A. Then, the navigation system will process the captured links for building a more refined path in the steps 112 and 113 based on the promoted links and parent links, etc. This process will be described in more detail with reference to the flow chart of FIG. 8A and the diagrams of FIGS. 8B-8E.

The schematic diagrams of FIGS. 8B-8E correspond to that of FIGS. 6B-6D and show the method of building a path based on the route search data obtained in the foregoing. In the example of FIG. 6D described above, the upper link L20 in the layer 59B is a promoted link and the link L23 is a parent link of the upper link L20. In the present invention, to build a path based on the promoted links and the parent links, climbing links, etc., stored in the expansion heap 267 are examined in the direction opposite to that described in the foregoing.

Figure 8A:
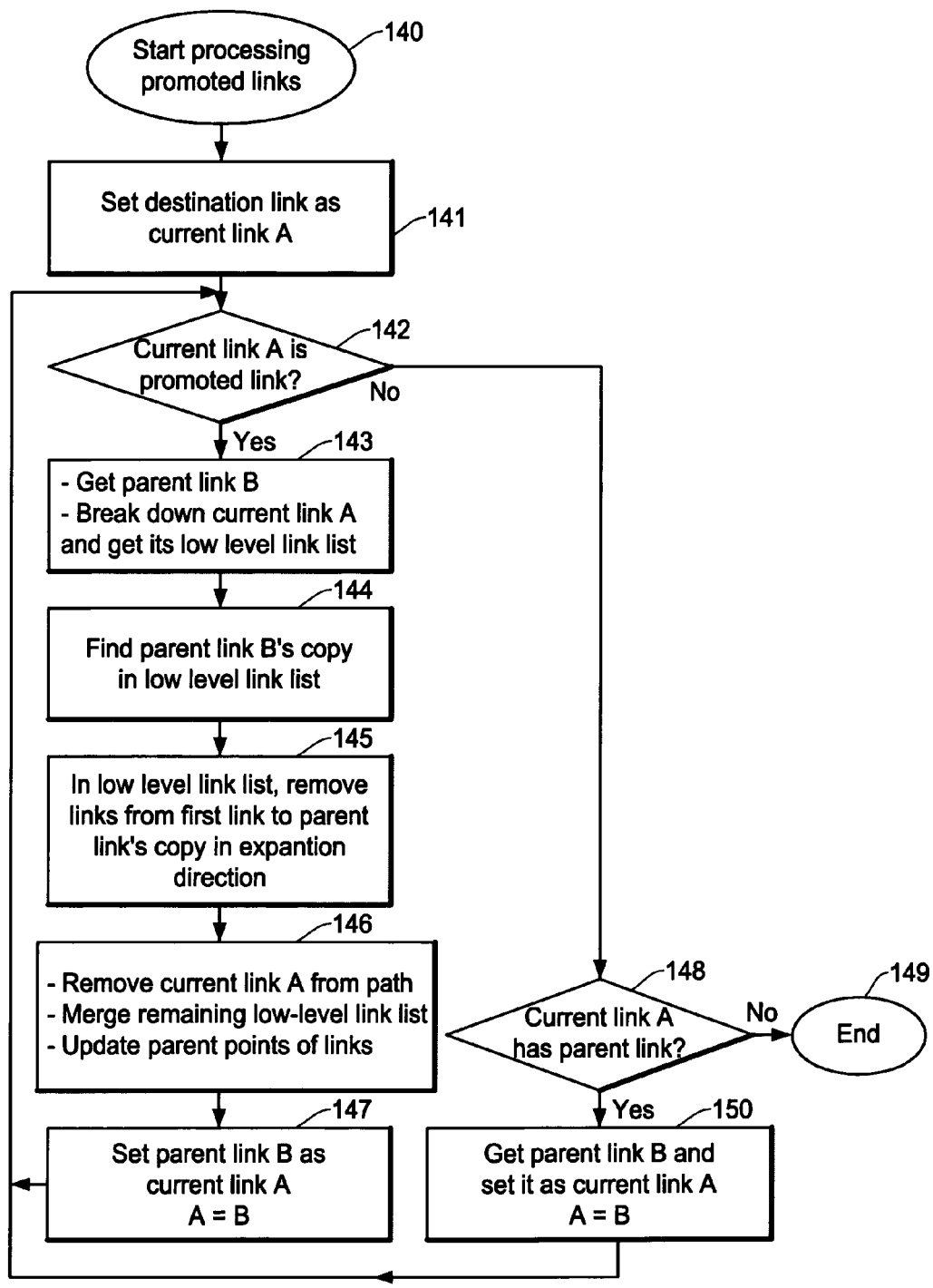
FIGS. 8A-8E show the operation of the link promotion method of the present invention where

In the flow chart of FIG. 8A, as the procedure starts in the step 140, the navigation system sets the destination link as a current link A in the step 141. In other words, the links stored in the foregoing process are examined in the direction from the destination to the start point. In the case where the route search has been proceeded starting from the destination toward the starting point, the procedure of FIG. 8A may be started in the direction from the starting point to the destination. By repeating the process of FIG. 8A in the link by link manner, the destination link shifts toward the start point so that the destination link eventually becomes the links A in FIGS. 8B-8D.

Figure 8B:
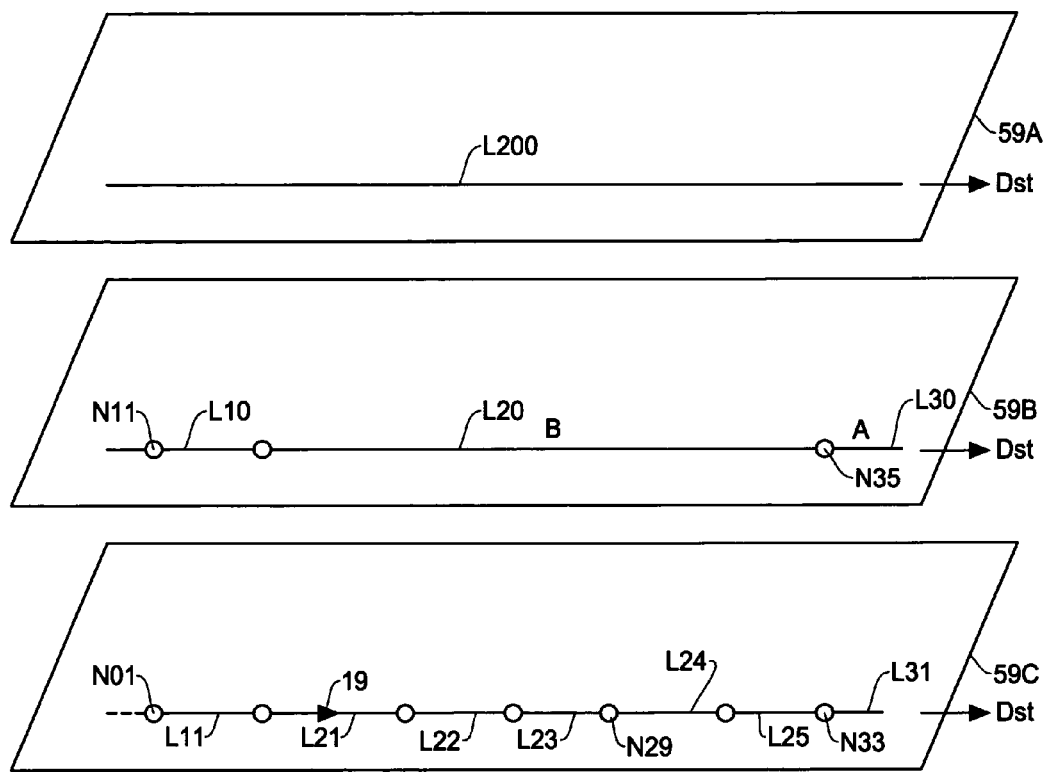

In the step 142, the navigation system determines whether the current link A is a promoted link. In the case of FIG. 8B, the link L30 in the layer 59B is now a destination link (current link A). Since the link L30 (current link A) is not a promoted link, the procedure shifts to the step 148 where the navigation system checks whether the current link A has a parent link.

If there is no parent link to the link A in the step 148, the process of FIG. 8A for the promoted links will end at the step 149. If it is determined that the current link A has a parent link in the step 148, the navigation system will retrieve the parent link B and set the parent link B as the current link A in the step 150. In the example of FIG. 8B, the link B (link L20) is a parent link of the current link A (link L30) since the link L30 is a successor of the link L20. Thus, in the step 150, the link L20 is now set to the current link A as shown in FIG. 8C, and the procedure is repeated from the step 142.

When it is determined that the current link A is a promoted link in the step 142, the parent link B of the link A is retrieved. Since the current link A (link L20) in FIG. 8C is a promoted link, the procedure will move to the step 143 in which the navigation system will retrieve the parent link B (link L23) in the lower layer 59C. In the step 143, since the current link A is the prompted link and its parent link B is in the lower layer 59C, the navigation system breaks down the current link A into a series of links in the lower layer.

Thus, the link L20 in the layer 59B is conceptually broken down to the links L21, L22, L23, L24 and L25 in the layer 59C. In the step 144, the navigation system will find a copy of the parent link B (link L23) in the lower layer 59C. In the step 145, all links starting from the origin (start point) to the parent link B (link L23) toward the direction of expansion will be removed from the copy of the lower layer 59C. Thus, in the example of FIG. 8C, the links L21, L22, and L23 will be removed as indicated by the dotted lines.

Figure 8C:
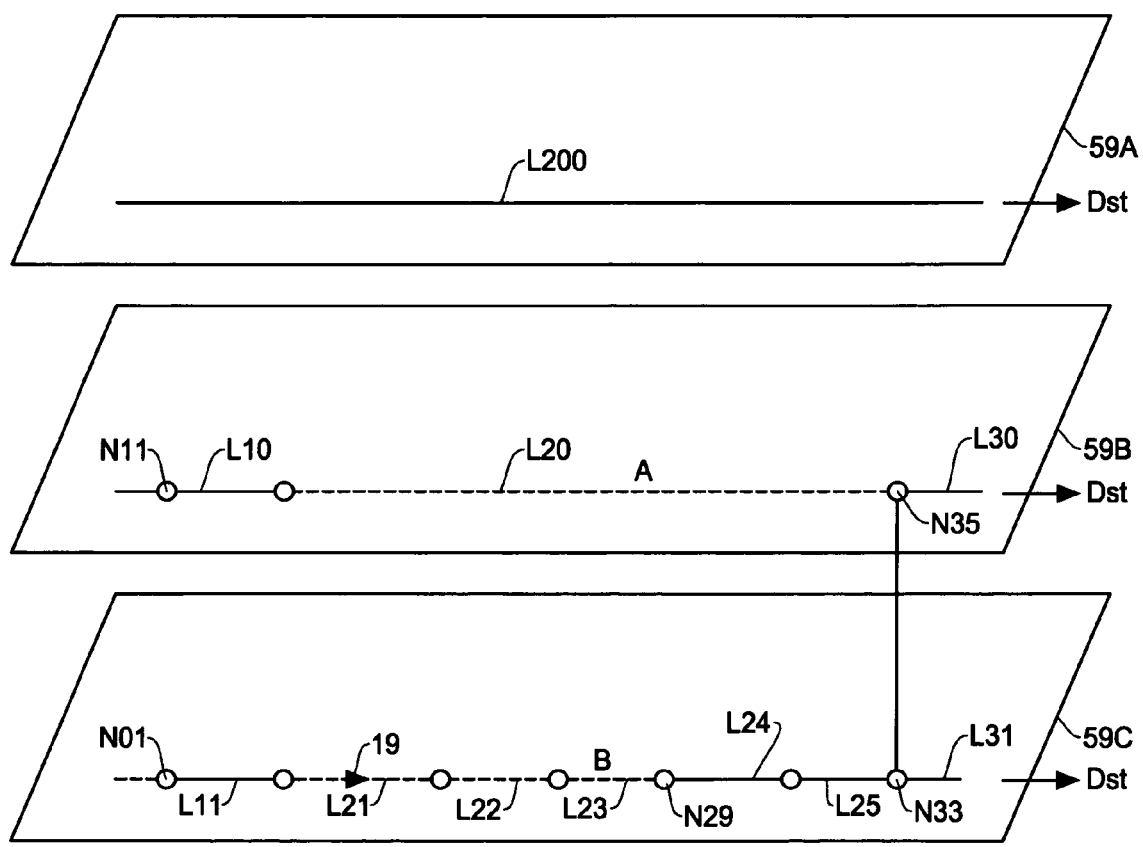

Then, in the step 146, the navigation system also removes the current link A (link L20) from the path as also indicated by the dotted line in FIG. 8C. The navigation system merges the remaining low level links with the path that has been developed from the destination link to the link L30. In the example of FIG. 8C, the remaining links, L24 and L25 are merged into the path (link L30), thereby establishing the path associated with the promoted link.

Figure 8D:
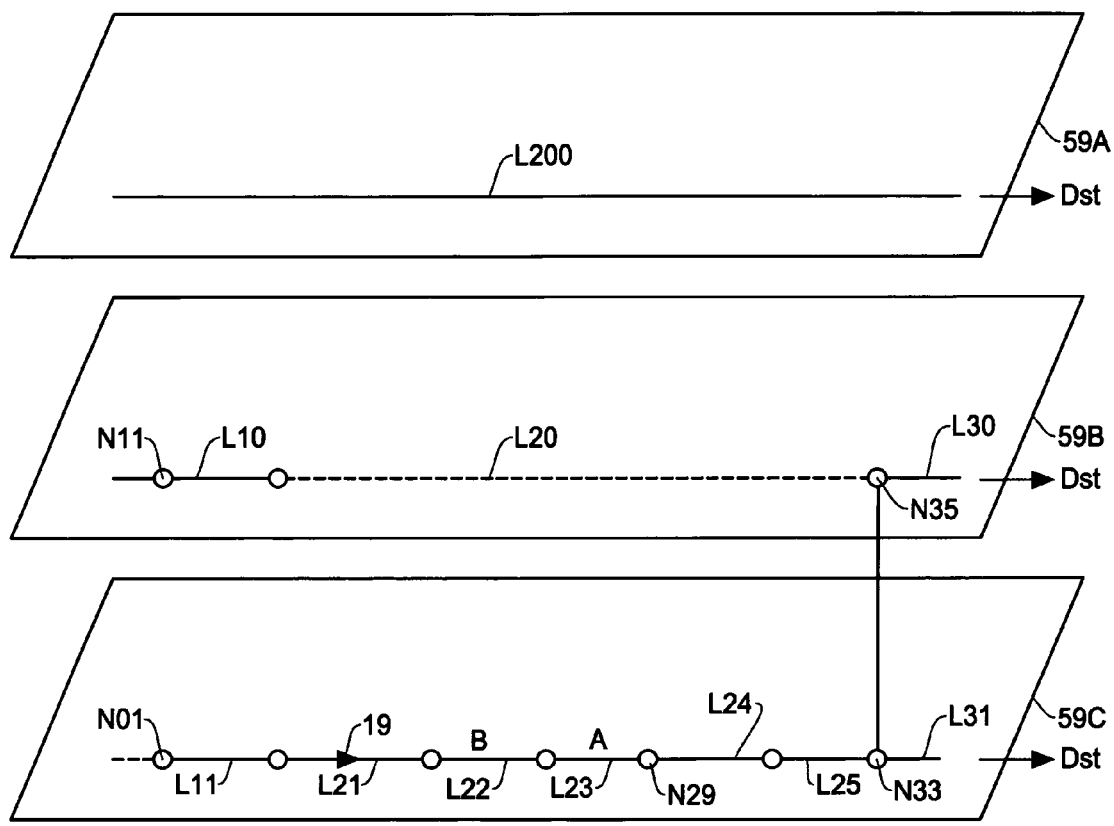

In the step 147, the navigation system sets the parent link B (link L23) as a current link A to further proceed to the path building operation. The process now goes back to the step 142 to repeat the above procedure for the next link. As shown in FIG. 8D, since the link L23 is now a current link A, the link L22 is a parent link B of the current link A (link L23) since the link L23 is a successor of the link L22.

Figure 8E:
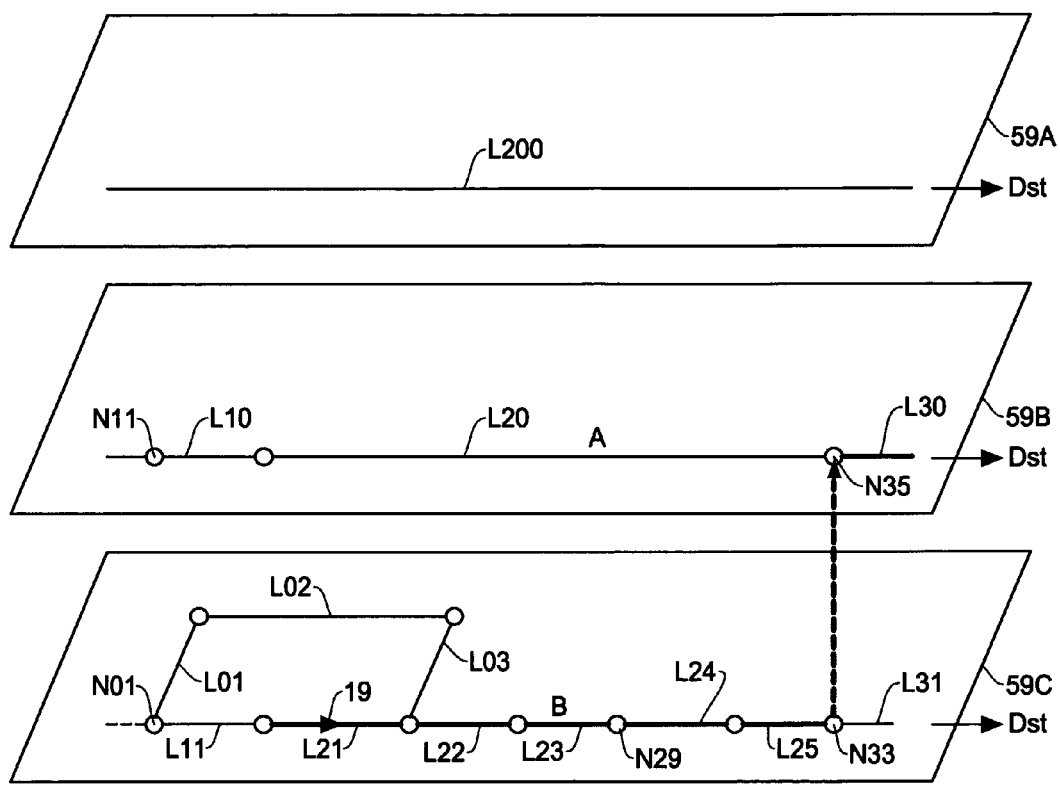

As noted above, when the current link A is not a promoted link, the procedure will advance to the step 148 where it will be determined whether the current link A has its parent link. Since the current link A (link L23) is not a promoted link and has its parent link B (link L22), the process moves to the step 150 where the link L22 is now set as a current link A. By repeating the above procedure, the final path will be created as shown in FIG. 8E which is able to avoid the problems (return to the previous point) in the conventional technology described with reference to FIGS. 2A and 2B. Namely, unlike the conventional example shown in FIG. 2B, the route shown in FIG. 8E proceeds to the links L22-L25 and climb-up to the upper layer via the climbing-up node N33 to the upper node N35.

Figure 9:
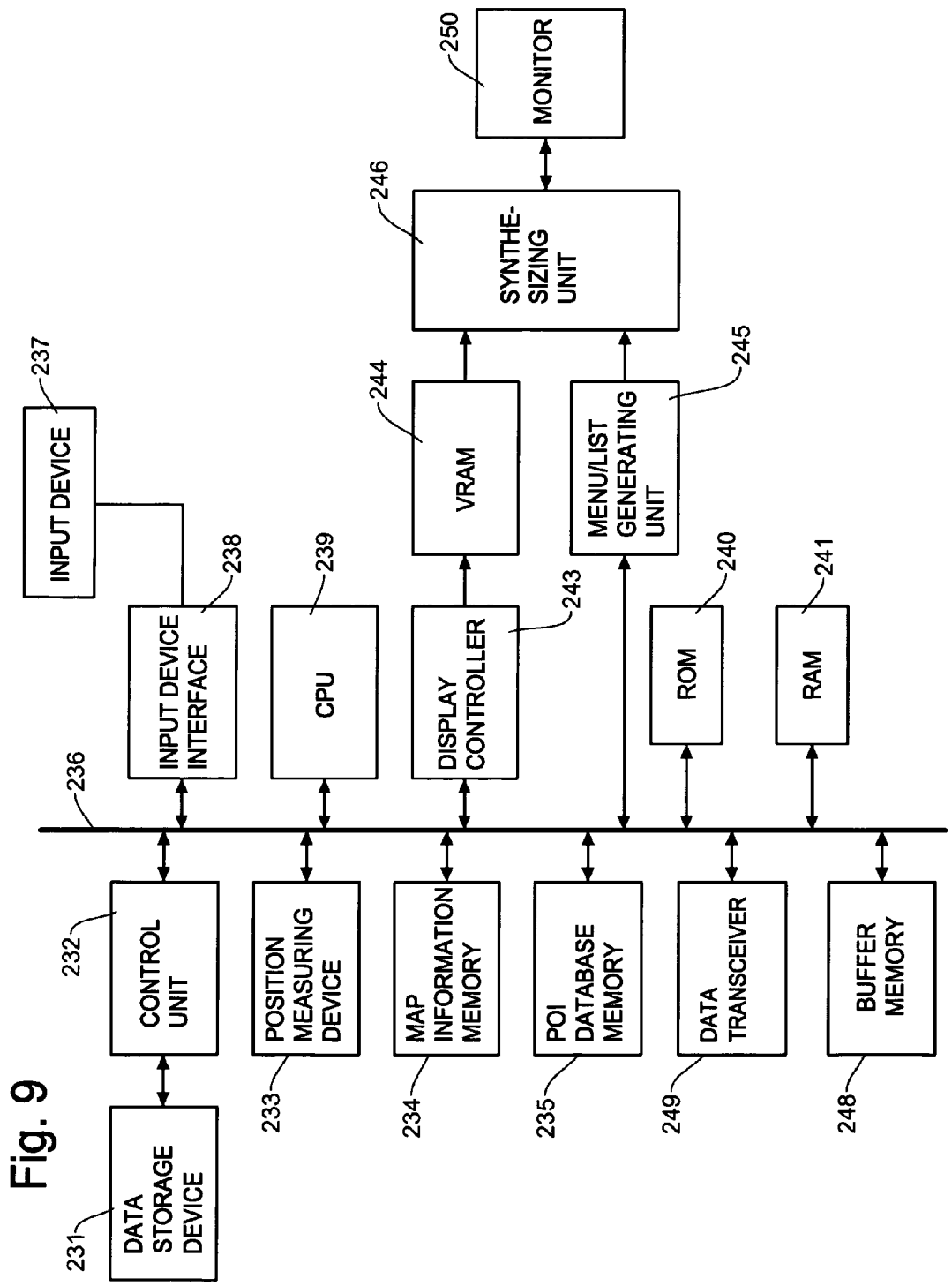
FIG. 9 is a functional block diagram showing an example of structure of a vehicle navigation system implementing the link promotion method and apparatus of the present invention.

FIG. 9 is a block diagram showing an example of structure of a vehicle navigation system for implementing the present invention. The components similar or identical to that shown in FIG. 4 are denoted by the same reference numbers. While the vehicle navigation system is explained for an illustration purpose, the present invention can also be applied to other types of navigation system, such as a portable navigation device implemented by a PDA (personal digital assistant) device, other hand-held devices such as a wireless telephone, or a laptop or notebook computer.

In the block diagram, the navigation system includes a data storage device 231 such as a hard disc, CD-ROM, DVD or other storage means for storing the map data. The navigation system includes a control unit 232 for controlling an operation for reading the information from the data storage device 231, and a position measuring device 233 for measuring the present vehicle position or user position. For example, the position measuring device 233 has a vehicle speed sensor for detecting a moving distance, a gyroscope for detecting a moving direction, a microprocessor for calculating a position, a GPS (global positioning system) receiver for receiving GPS signals from satellites, and etc.

The block diagram of FIG. 9 further includes a map information memory 234 for storing the map information which is read from data storage device 231, a database memory 235 for storing database information such as point of interest (POI) information which is read out from the data storage device 231, a remote controller 237 for executing a menu selection operation, an enlarge/reduce operation, a destination input operation, etc. and a remote controller interface 238. Although a remote controller is a typical example for selecting menus, executing selected functions and etc., the navigation system includes various other input methods to achieve the same and similar operations done through the remote controller.

In FIG. 9, the navigation system further includes a bus 236 for interfacing the above units in the system, a processor (CPU) 239 for controlling an overall operation of the navigation system, a ROM 240 for storing various control programs such as a route search program and a map matching program necessary for navigation control, a RAM 241 for storing a processing result such as a guide route, a display controller 243 for generating map image (a map guide image and an arrow guide image) on the basis of the map information, a VRAM 244 for storing images generated by the display controller 243, a menu/list generating unit 245 for generating menu image/various list images, a synthesizing unit 246, a data transceiver 249 for wireless communication to retrieve data from a remote server, a buffer memory 248 for temporarily storing data for ease of data processing, and a monitor (display) 250.

Figure 7:
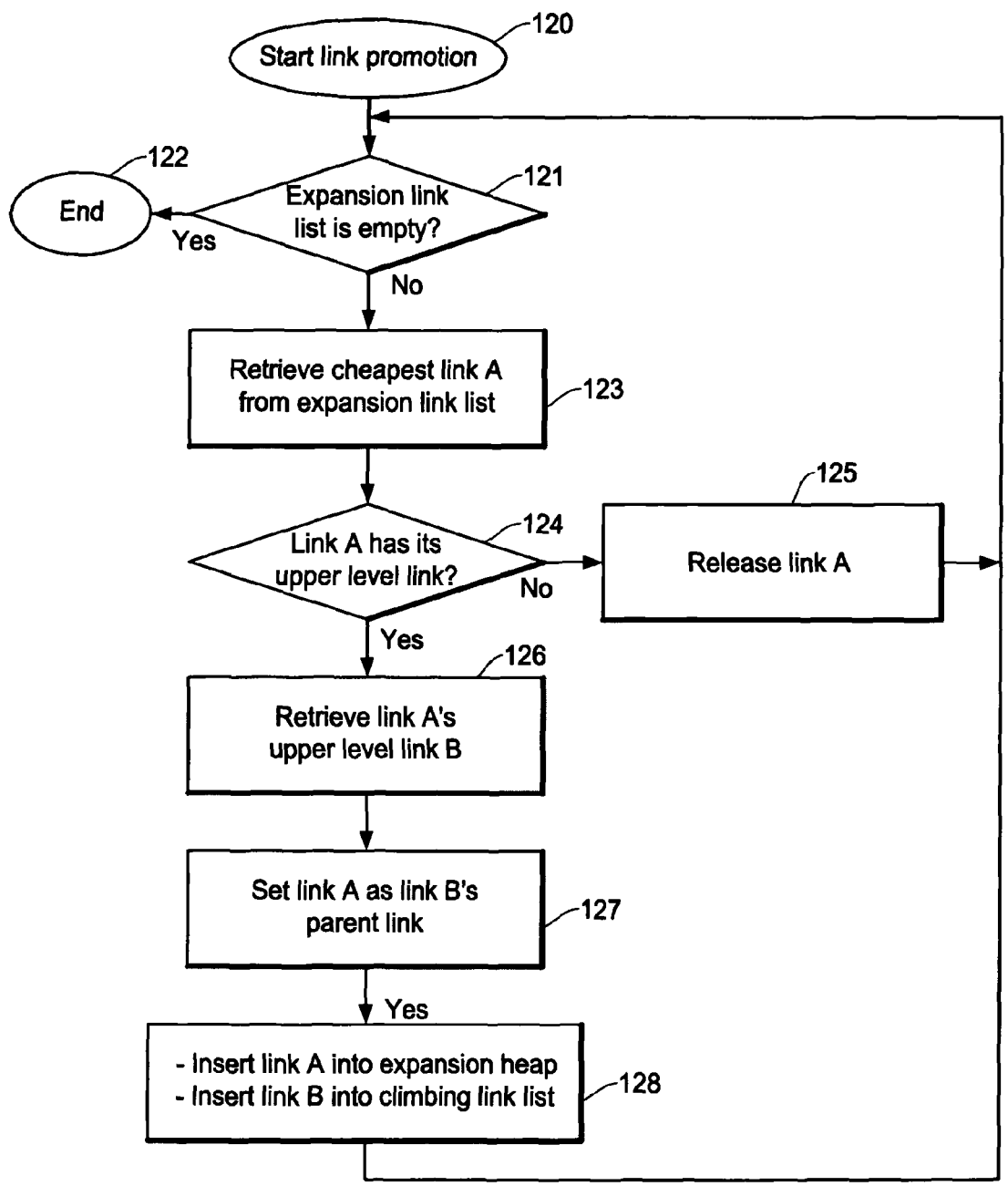
FIG. 7 is a flow chart showing an example of detailed process that corresponds to the steps 106 and 107 in the flow chart of FIG. 6A regarding the link promotion procedure in accordance with the present invention.

As noted above with reference to FIG. 4, based on the retrieved map data, the navigation system obtains various possible links by temporarily storing the necessary data in the buffer memory 248 or other storage device for the route search operation. As shown in FIG. 4, the buffer memory 248 may be configured by the expansion link list 265, the expansion heap 267, and the climbing list 269 each storing the selected map data for the route search and calculation. A program to perform the route search operation including the link promotion method as described with reference to the flow charts in FIGS. 6A, 7 and 8A is stored in the ROM 240 or other program storage.

As has been described above, according to the present invention, the route search method and apparatus enables the navigation system to search an efficient route between a start point and a destination when examining the map data in a layered structure. The navigation system searches and calculates a route between the start point and the destination, checks various possible links starting from both the start point and the end point with use of a predetermined algorithm. During such an operation, the route search method and apparatus conducts the "link promotion" for the links on the current map data layer to that corresponding to an upper layer of map data to obtain an optimum route. The link promotion method and apparatus determines whether there is a higher level street for a link (road segment) on the current layer of the map data. If a corresponding higher level link is found, the method operates to effectively promote a link that satisfies the predetermined condition to the upper layer even though there is no climbing-up node for the link. After such links are promoted, the navigation system will determine an optimal route based on the promoted links and associated links via a route building process. Accordingly, the present invention is able to prevent an inappropriate climbing point from being included in the final route between the start point and the destination.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A computer implemented method of searching a route between a start point to a destination for a navigation system, comprising the following steps of:
   executing, by a processor, a predetermined route search algorithm on map data having a layered structure for a predetermined direction between the start point and the destination for each predetermined search range;
   retrieving candidate links from the map data stored in a computer-readable medium for creating a route between the start point and the destination and temporarily storing the candidate links in a computer-readable data storage;
   applying, by the processor executing a program, climbing criteria that determine whether there is a climbing-up node between a lower layer and a higher layer within the predetermined search range, and promotion criteria that determine whether there is a higher layer link corresponding to the candidate links retrieved from the data storage to find whether there is a link in the lower layer of the map data to be promoted to a corresponding link in a the higher layer of the map data;
   storing, in the computer-readable medium, data related to the links in the lower layer and the higher layer that have satisfied the climbing criteria and the promotion criteria; and
   building a path between the destination and the start point by processing, by the processor executing a program, the data related to the links that have satisfied the criteria in a direction opposite to the predetermined direction executed for the route search algorithm.

2. A method of searching a route as defined in claim 1, further comprising a step, conducted by the processor, of shifting from the link in the lower layer to the corresponding link in the higher layer even when there is no climbing-up node between the two links when the relationship between the two links have satisfied the promotion criteria.

3. A method of searching a route as defined in claim 1, wherein the step of retrieving the candidate links from the map data includes a step, conducted by the processor, of searching a successor link that is successive to a current link and calculating a cost of each successor link.

4. A method of searching a route as defined in claim 3, wherein the data storage includes an expansion link list for storing the candidate links, an expansion heap for storing the current link as a parent link of the successor link, and a climbing link list for storing the corresponding link in the higher layer as a climbing link when either there is a climbing-up node or the promotion criteria is satisfied, where the link in the lower layer that corresponds to the climbing link is stored in the expansion heap as a parent link of the climbing link.

5. A method of searching a route as defined in claim 3, wherein the step of searching the successor link that is successive to a current link includes a step, conducted by the processor, of obtaining a successor link of lowest cost where the cost is determined by factors including a distance, time, and fees associated with the successor link.

6. A method of calculating a route as defined in claim 4, further comprising a step, conducted by the processor, of deleting the data in the expansion link list every time when all of the candidate links within the predetermined search range have been examined.

7. A method of searching a route as defined in claim 1, wherein the promotion criteria is satisfied when there is a link in the higher layer of the map data that corresponds to a link in the lower layer, and the climbing criteria is satisfied when there is a climbing-up node between the lower layer and the higher layer within the predetermined search range.

8. A method of searching a route as defined in claim 4, wherein the step of building the path between the destination and the start point includes a step, conducted by the processor, of removing copies of series of links in the lower layer from the start point to the parent link and a step of removing the climbing link corresponding to the parent link.

9. A method of searching a route as defined in claim 8, wherein the step of building the path between the destination and the start point further includes a step, conducted by the processor, of merging links that have been remained after the removal of the links, thereby building a route that shifts the different layers of the map data via a climbing-up node.

10. A method of searching a route as defined in claim 1, further comprising a step, conducted by the processor, of evaluating a cost associated with a route involving the links that have satisfied the promotion criteria in comparison with a cost associated with a route without using the link promotion.

11. An apparatus for searching a route between a start point to a destination for a navigation system, comprising:
   means for executing a predetermined route search algorithm on map data having a layered structure for a predetermined direction between the start point and the destination for each predetermined search range;
   means for retrieving candidate links from the map data for creating a route between the start point and the destination and temporarily storing the candidate links in a data storage;
   means for applying climbing criteria that determine whether there is a climbing-up node between a lower layer and a higher layer within the predetermined search range, and promotion criteria that determine whether there is a higher layer link corresponding to the candidate links retrieved from the data storage to find whether there is a link in the lower layer of the map data to be promoted to a corresponding link in the higher layer of the map data;
   means for storing data related to the links in the lower layer and the higher layer that have satisfied the climbing criteria and the promotion criteria; and
   means for building a path between the destination and the start point by processing the data related to the links that have satisfied the criteria in a direction opposite to the predetermined direction executed for the route search algorithm.

12. An apparatus for searching a route as defined in claim 11, further comprising means for shifting from the link in the lower layer to the corresponding link in the higher layer even when there is no climbing-up node between the two links when the relationship between the two links have satisfied the promotion criteria.

13. An apparatus for searching a route as defined in claim 11, wherein the means for retrieving the candidate links from the map data includes means for searching a successor link that is successive to a current link and calculating a cost of each successor link.

14. An apparatus for searching a route as defined in claim 13, wherein the data storage includes an expansion link list for storing the candidate links, an expansion heap for storing the current link as a parent link of the successor link, and a climbing link list for storing the corresponding link in the higher layer as a climbing link when either there is a climbing-up node or the promotion criteria is satisfied, where the link in the lower layer that corresponds to the climbing link is stored in the expansion heap as a parent link of the climbing link.

15. An apparatus for searching a route as defined in claim 13, wherein the means for searching the successor link that is successive to a current link includes a step of obtaining a successor link of lowest cost where the cost is determined by factors including a distance, time, and fees associated with the successor link.

16. An apparatus for calculating a route as defined in claim 14, further comprising means for deleting the data in the expansion link list every time when all of the candidate links within the predetermined search range have been examined.

17. An apparatus for searching a route as defined in claim 11, wherein the promotion criteria is satisfied when there is a link in the higher layer of the map data that corresponds to a link in the lower layer, and the climbing criteria is satisfied when there is a climbing-up node between the lower layer and the higher layer within the predetermined search range.

18. An apparatus for searching a route as defined in claim 14, wherein the means for building the path between the destination and the start point includes means for removing copies of series of links in the lower layer from the start point to the parent link and means for removing the climbing link corresponding to the parent link.

19. An apparatus for searching a route as defined in claim 18, wherein the means for building the path between the destination and the start point further includes means for merging links that have been remained after the removal of the links, thereby building a route that shifts the different layers of the map data via a climbing-up node.

20. An apparatus for searching a route as defined in claim 11, further comprising means for evaluating a cost associated with a route involving the links that have satisfied the promotion criteria in comparison with a cost associated with a route without using the link promotion.

* * * * *